United States Patent [19]
Gautheron

[11] Patent Number: 6,025,948
[45] Date of Patent: Feb. 15, 2000

[54] OPTICAL SIGNAL TRANSMISSION INSTALLATION INCLUDING A REPEATER MONITORING SYSTEM

[75] Inventor: Olivier Gautheron, Montigny Le Bretonneux, France

[73] Assignee: Alcatel Submarine Networks, Clichy, France

[21] Appl. No.: 08/799,571

[22] Filed: Feb. 12, 1997

[30] Foreign Application Priority Data

Feb. 13, 1996 [FR] France .................................. 96 01742

[51] Int. Cl.[7] .................................................. H04B 10/02
[52] U.S. Cl. ........................ 359/177; 359/110; 359/179
[58] Field of Search .................................. 359/177, 179, 359/160, 143, 173, 110

[56] References Cited

U.S. PATENT DOCUMENTS

| | | | |
|---|---|---|---|
| 5,162,936 | 11/1992 | Taga et al. ................................ | 359/177 |
| 5,532,864 | 7/1996 | Alexander et al. ...................... | 359/177 |
| 5,535,037 | 7/1996 | Yoneyama ................................ | 359/177 |
| 5,877,878 | 3/1999 | Horiuchi et al. ........................ | 359/110 |

FOREIGN PATENT DOCUMENTS

2696302A1  4/1994  France .

OTHER PUBLICATIONS

*Patent Abstracts of Japan*, vol. 95, No. 007 corresponding to JP-A-07 183871 (NEC Corporation) dated Jul. 21, 1995.

*Primary Examiner*—Kinfe-Michael Negash
*Attorney, Agent, or Firm*—Sughrue, Mion, Zinn, Macpeak & Seas, PLLC

[57] ABSTRACT

A system is disclosed for monitoring repeaters of an installation for transmission of signals via optical conductors in which each repeater includes an optical amplifier for amplifying the signals transmitted by the optical conductors. A remote monitoring signal is transmitted from a main or monitoring center to each repeater. The system includes, at the main center, a remote monitoring signal transmitter having a wide spectrum of optical wavelengths, preferably at least as wide as the wanted spectrum of wavelengths of the optical signals transmitted on the conductors. In this way the wanted signal is virtually undisturbed by the remote monitoring signal.

12 Claims, 1 Drawing Sheet

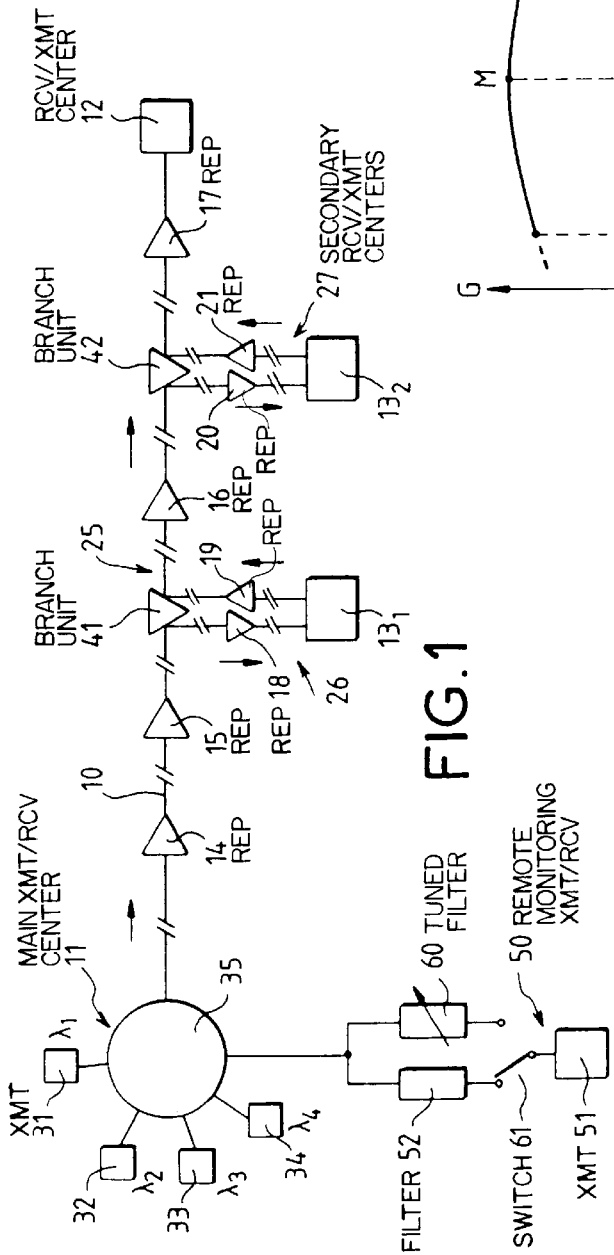
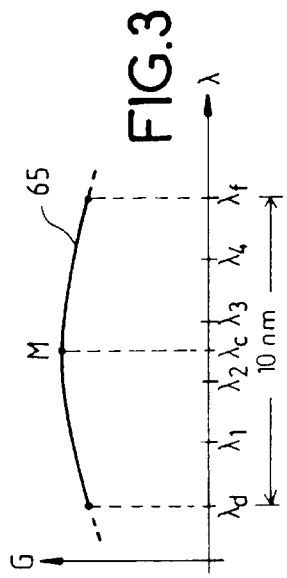
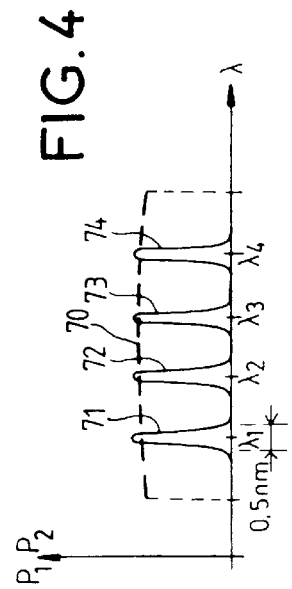
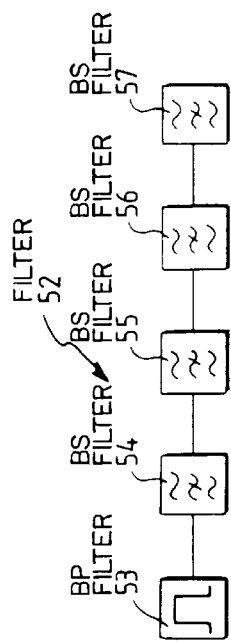

OPTICAL SIGNAL TRANSMISSION INSTALLATION INCLUDING A REPEATER MONITORING SYSTEM

BACKGROUND OF THE INVENTION

1. Field of the Invention

The invention relates to a system for monitoring or supervising the repeaters of an optical signal transmission installation.

2. Description of the Prior Art

The transmission of signals over optical fibers is now a routine technique in diverse applications, in particular in submarine telephone lines. Its advantages include the ability to accommodate high bit rates with a high bandwidth without significant deterioration of the signals.

An installation of this type comprises a transmit center in which there is provided at least one laser source the luminous energy from which is modulated by the signal to be sent; the modulated energy is transmitted by optical fibers to at least one remotely located receiver. Between the transmitter and the receiver there are repeaters in the form of optical amplifiers such as doped fiber optical amplifiers. The function of the repeaters is to amplify the signal periodically, attenuation of the signal being inherent to the transmission medium, so that it reaches the receiver at a satisfactory level.

The most elaborate installations include branch connections to secondary receivers. Each branch connection, also using optical fibers, also includes one or more repeaters.

For example, a transatlantic optical link comprises a transmitter in North America and its main receiver in a European country. The branch connections go to other European countries in which secondary receivers are located.

In a complex high bit rate installation several different transmission optical wavelengths, i.e. several lasers, may be used.

The correct functioning of an installation of this kind is largely dependent on the correct functioning of the repeaters. It is therefore necessary to monitor these devices periodically or continuously. However, as they are widely dispersed and often at locations where access is difficult, remote monitoring is used. To this end, a remote monitoring signal is transmitted over the line from the transmit center, often superimposed on the signal carrying wanted information. The remote monitoring signal generally has a bit rate of 1 kbit/s, while the wanted signal has a bit rate of 5 Gbit/s. Its level is usually low in comparison to that of the wanted signal.

Remote monitoring is effected by means of a protocol for interrogating each repeater. Each of the latter is identified by its numerical address. For example, the interrogation protocol entails detecting the input power, the output power and the power of the pump laser of the optical amplifier. The response signals are retransmitted to the transmit center by the repeater using the return channel of the line. In a simpler system the interrogation protocol is limited to detecting the output power of each repeater.

In a single-channel transmission system, i.e. one using only one optical wavelength, the remote monitoring signal is superimposed on the wanted signal, i.e. the wanted signal is modulated by the remote monitoring signal. The depth of modulation is usually in the order of 5%. This value represents a compromise between the need to reduce the disturbance of the wanted signal and the need to transmit the remote monitoring signal correctly.

In an installation using a plurality of optical wavelengths and with branch connections it is preferable not to modulate individually each of the wavelengths used to transmit the wanted signals. In installations of this kind, some wavelengths being assigned to transmission to branch connections, the remote monitoring signal would be lost downstream of the branch connection.

It is true that a secondary center in a branch connection retransmits a wanted signal; however, it is preferable not to superimpose a monitoring signal on the retransmitted wanted signal in order to reserve the monitoring function to the main center.

Under the above conditions the signal at the output of the repeater downstream of the branch connection would be modulated with a depth of modulation less than the optimal value of 5%. Each repeater transmits a constant output power, so it is understandable that if the repeater transmits two wavelengths of which one carries no modulation and the other carries 5% modulation, the output signal will be modulated to a depth of 2.5% if the optical powers of the two wavelengths are equal.

Furthermore, as the gain of the optical amplifiers is not the same for all wavelengths, so it is also understandable that the reduction in the modulation will be even more significant if the wavelength extracted and re-injected with no remote monitoring signal corresponds to the maximal value of the gain of the optical amplifiers.

The invention remedies these drawbacks. It also makes the disturbance due to the remote monitoring modulation virtually negligible.

SUMMARY OF THE INVENTION

In accordance with the invention, the installation comprises, for emission and transmission of the remote monitoring signal, a wideband source of optical wavelengths corresponding to the bandwidth of the optical amplifiers.

The light signal to be modulated by the remote monitoring signal is, for example, that emitted by a light-emitting diode having a continuous spectrum of wavelengths from 50 nm through 100 nm and centered in the band of the gain of the optical amplifiers. This band is generally in the order of 10 nm.

The remote monitoring modulation is spread across all of the 10 nm wanted optical band. In this way the disturbance introduced by the remote monitoring signal is introduced in the proportion of the ratio between the bandwidth occupied by each wanted wavelength (those transmitting information signals) and the 10 nm overall bandwidth. For example, if each wanted optical wavelength occupies a bandwidth of 0.5 nm, the disturbance of the wanted power is in the order of 5% if the power of the source allocated to remote monitoring is in the same order of magnitude as the power of the sources allocated to the wanted signals. However, the power supplied by the light-emitting diode is preferably only in the order of 5% of the total power emitted by the various sources. In this case the disturbance will be at most 0.25%. It is therefore negligible.

Moreover, the spreading of the remote monitoring signal over all of the wanted spectrum facilitates transmission installation implementation since the choice of the spectral position of the wanted wavelengths is not limited by the remote monitoring, as would be the case if a particular wavelength were allocated to remote monitoring.

The transmitter allocated to remote monitoring being separate from the wanted signal transmitters, it can therefore have a narrower electro-optical bandwidth than that required for the transmission of the wanted signals. This reduces the cost.

In one embodiment, the disturbance introduced by the remote monitoring signal is further reduced by providing band-stop filters in the remote monitoring channel that reject the bands allocated to the transmission of wanted signals.

Other features and advantages of the invention will emerge from the following description of some embodiments of the invention given with reference to the accompanying drawings.

BRIEF DESCRIPTION OF THE DRAWINGS

FIG. 1 is a block diagram of an installation in accordance with the invention.

FIG. 2 corresponds to part of the FIG. 1 installation.

FIG. 3 is a diagram showing the gain of a repeater from the FIG. 1 installation.

FIG. 4 is a diagram also relating to FIG. 1.

DETAILED DESCRIPTION OF THE PREFERRED EMBODIMENT

The example illustrated by FIG. 1 is that of a communication system using optical conductors or fibers 10 between a main transmit/receive and monitoring center 11 and a receive/transmit center 12. Secondary receive/transmit centers $13_1$, $13_2$, etc are also able to receive signals from the main center 11 and to transmit other signals to the other receivers of the installation.

In a manner that is known in itself, the fiber optic link 10 comprises a set of optical fibers made of silica lightly doped with germanium, for example, transmitting under optimal conditions wavelengths between 1 500 nm and 1 600 nm.

The fiber optic cable is intended, for example, to transmit digital data or telephone calls over great distances, for example several thousand kilometers. This being so, the signal transmitted by the optical conductor must be regenerated at intervals. Although low, absorption by the fibers strongly attenuates the signal over a long distance. If the fiber is of silica lightly doped with germanium the attenuation is approximately 0.2 dB/km.

Repeaters 14, 15, 16, 17, 18, 19, 20 and 21, etc are provided on the main link 25 and on the branch connections 26, 27, etc.

A repeater usually comprises one or more doped fiber optical amplifiers and a pump laser for inverting the electron population in the material of the doped fiber.

The repeaters are usually at locations where access is difficult or impossible and are therefore monitored remotely.

The main transmit center 11 has four transmitters 31, 32, 33 and 34 each transmitting wanted signals on a particular optical wavelength, i.e. digital data signals or telephone signals. Each wavelength is produced by one laser (not shown).

The optical wavelength of each of the lasers of the transmitters 31, 32, 33, 34 has a bandwidth of approximately 0.5 nm and these lasers emit in an optical band 10 nm wide. This width of 10 nm is imposed by the gain of the repeaters, as explained below with reference to FIG. 3.

The signals from the transmitters 31 through 34 are transmitted to the optical conductor 10 through a coupler 35.

The transmitter 31 includes a laser of wavelength $\lambda_1$ (FIG. 3) adapted to transmit information to the receive/transmit center $13_1$ at the end of the branch connection 26. The center $13_1$ transmits other information to the receive/transmit center 12 and the other centers $13_2$ (at the end of the branch connection 27) and to the center 11. This transmission uses the same optical wavelength $\lambda_1$.

Similarly, the transmitter 32 transmits on another wavelength $\lambda_2$ to the second branch connection 27. Like the first secondary center $13_1$, the second secondary center $13_2$ transmits other signals at wavelength $\lambda_2$ to other secondary receivers, to the main receiver 12 and to the center 11.

The transmitter 33 transmits a signal addressed to a third branch connection, not shown, on a third wavelength $\lambda_3$.

Finally, the fourth transmitter ($\lambda_4$) transmits only to the main receive center 12.

At each junction between the main line 10 and a branch connection there is a branch connection unit 41, 42, etc which effects the branch connection to the corresponding secondary center.

A remote monitoring transmitter/receiver 50 is provided at the main center 11 for remote monitoring of the repeaters 14 through 21. This transmitter/receiver 50 sends over the line 10 digital signals at a bit rate that is relatively low in comparison to the bit rate of the signals transmitted by the transmitters 31 through 34. For example, information signals have a bit rate of 5 Gbit/s and the remote monitoring signals have a bit rate of 1 kbit/s. The latter signals are modulated at a frequency in the order of 100 kHz.

The remote monitoring signals are, for example, digital packets of interrogation signals carrying the various addresses of the repeaters. Each repeater is adapted to send back to the center 11, in the opposite direction over the line 10, a signal representing its input power, its output power and the power of its pump.

In accordance with one important aspect of the invention, the remote monitoring signal is carried by a light wave that is not monochromatic but covers all of the wanted optical spectrum of the fiber, that is to say a bandwidth of at least 10 nm in this example (FIGS. 3 and 4).

Accordingly, the remote monitoring module 50 includes a transmitter 51 incorporating a light-emitting diode emitting a continuous spectrum of wavelengths centered on 1 550 nm with a width in the order of 100 nm. This light-emitting diode is, for example, an InGaAs diode with a minimum power of 0.1 mW and with an electro-optical bandwidth of 100 MHz. A diode of this kind emits in the range from 1 530 nm to 1 580 nm. Its emission spectrum has a mid-height width of 50 nm.

The radiation from the light-emitting diode is amplitude modulated by the remote monitoring signals.

To minimize the disturbing effect of the remote monitoring signals produced by the transmitter 51 on the wanted signals produced by the transmitters 31 through 34, the power of the transmitter 51 is approximately 5% of the total power transmitted over the line 10.

The remote monitoring signal produced by the transmitter 51 is transmitted to the coupler 35 via filter means 52 comprising (FIG. 2) a band-pass filter 53 to eliminate wavelengths outside the 10 nm wanted window, a filter 54 to eliminate the wavelength $\lambda_1$ and filters 55, 56 and 57 to eliminate the respective wavelengths $\lambda_2$, $\lambda_3$ and $\lambda_4$.

The filters 54, 55, 56 and 57 therefore minimize the disturbance to the wanted signals caused by the remote monitoring wavelength.

Even in the absence of these filters, the disturbance is slight. It depends on the ratio between the power of the signal produced by the transmitter 51 and the total power and on the ratio between the bandwidth occupied by a transmitter laser and the total bandwidth of 10 nm. In the example here described this latter ratio is 0.5/10.

In the installation shown in FIG. 1, there is also a tunable filter 60 connected to the coupler 35 and to the output of the transmitter 51. A switch 61 connects the transmitter 51 to the coupler 35 either via the filter means 52 or via the tunable filter 60. The filter 60 can be tuned to the wavelengths of the lasers of the transmitters 31, 32 and 33 to enable remote monitoring of the repeaters 18, 19, 20, 21, etc on the branch connections 26, 27, etc. The filter 60 is not in service when the repeaters 14, 15, 16, 17 on the main channel are being monitored.

As an alternative to this, the remote monitoring signals for the repeaters on the branch connections are conventionally produced by the transmitters 31, 32 and 33, these remote monitoring signals being superimposed on the wanted signals.

FIG. 3 is a diagram in which the gain G of a repeater—i.e. an optical amplifier—is plotted on the ordinate axis as a function of the wavelength $\lambda$. The curve 65 has a maximum M at the wavelength $\lambda_c$ and minima for the wavelengths $\lambda_d$ and $\lambda_f$ at the start and the end of the spectral band to which the installation is limited. This curve 65 shows why the bandwidth of the transmission installation is limited to 10 nm. It can be seen that with a series of optical amplifiers in cascade the resultant curve will be accentuated, with a more marked gain difference between the wavelength $\lambda_c$ at the center of the 10 nm window and the wavelengths $\lambda_d$ and $\lambda_f$ at the ends of the window.

FIG. 4 is another diagram in which the wavelength is plotted on the abscissa axis. The curve 70 represents the distribution of the power $P_1$ emitted by the light-emitting diode of the transmitter 51 in the 10 nm wanted spectrum of wavelengths. The curves 71, 72, 73 and 74 represent the powers $P_2$ emitted by the lasers of the transmitters 31 through 34. Note that the power $P_1$ (curve 70) is not shown to scale with the powers $P_2$ since it is smaller than the latter by a factor of about 20. Be this as it may, FIG. 4 shows that the remote monitoring signal is "diluted" across all of the 10 nm wanted band. This reduces its disturbing effect.

There is claimed:

1. A system for monitoring repeaters of an installation for transmission of signals via optical conductors in which each repeater includes an optical amplifier for amplifying the signals transmitted by the optical conductors and which are carried on at least one optical carrier, wherein a remote monitoring signal is transmitted from a main or monitoring center to each repeater, said system comprising, at said main center, a transmitter of remote monitoring signals which are carried by a supplementary optical carrier and have a wide spectrum of optical wavelengths, at least as wide as the desired spectrum of wavelengths of the optical signals transmitted on the conductors and the transmitted signal is substantially undisturbed by the remote monitoring signal.

2. The system claimed in claim 1 wherein said remote monitoring signal transmitter includes a light-emitting diode.

3. The system claimed in claim 2 wherein said optical amplifier of each repeater is a constant power amplifier.

4. The system claimed in claim 1 wherein said width of said desired spectrum is on the order of 10 nm.

5. The system claimed in claim 1 wherein the power of said remote monitoring signal transmitter is on the order of one twentieth the total wanted power transmitted on said optical conductors.

6. The system claimed in claim 1 wherein said remote monitoring signal transmitter comprises a source having a bandwidth greater than the desired bandwidth and a band-pass type filter to limit transmission to said desired bandwidth.

7. The system claimed in claim 1 for use in an installation comprising a plurality of transmitters for transmitting desired signals on different optical wavelengths.

8. The system claimed in claim 7 for use in an installation comprising branch connections to secondary receive/transmit centers wherein each secondary transmitter supplies desired signals at a particular optical wavelength and with no remote monitoring signal.

9. The system claimed in claim 1 comprising at least one filter for eliminating from said monitoring signal transmitted on said optical conductors the wavelengths corresponding to the desired wavelength or wavelengths.

10. A system as claimed in claim 8 for monitoring repeaters of branch connections comprising at least one filter adapted to be tuned to the wavelength for said branch connection, said filter connecting the output of said remote monitoring signal transmitter to said optical conductor and a switch enabling said filter to be switched out of use for remote monitoring of repeaters of said main conductors.

11. A system as claimed in claim 1 for use in an installation in which said optical conductors comprise silica optical fibers doped with germanium.

12. An installation for transmitting signals via optical conductors, said installation comprising a plurality of repeaters each including an optical amplifier for amplifying the signals transmitted by the optical conductors, said installation including a repeater monitoring system comprising a remote monitoring signal transmitter and a main center for transmitting the remote monitoring signals from said main center to each repeater, said remote monitoring signals having a wide spectrum of optical wavelengths, preferably at least as wide as the desired spectrum of wavelengths of the optical signals transmitted on said conductors.

* * * * *